United States Patent
Shapiro (10) Patent No.: US 8,474,833 B2
(45) Date of Patent: Jul. 2, 2013

(54) CARRIER DEVICES WITH FOLD FLAT, FIXED, CASTER AND/OR SWIVEL WHEEL ASSEMBLIES

(76) Inventor: Richard N. Shapiro, Va Beach, VA (US)

(*) Notice: Subject to any disclaimer, the term of this patent is extended or adjusted under 35 U.S.C. 154(b) by 176 days.

(21) Appl. No.: 12/931,549

(22) Filed: Feb. 4, 2011

(65) Prior Publication Data
US 2012/0200052 A1    Aug. 9, 2012

(51) Int. Cl.
*B62D 61/08*    (2006.01)

(52) U.S. Cl.
USPC ............ 280/43; 280/658; 280/648; 280/643; 280/646; 280/650; 280/47.38

(58) Field of Classification Search
USPC .......... 280/642–647, 650–655, 47.38–47.41, 280/648, 641, 657, 658, 43, 62
See application file for complete search history.

(56) References Cited

U.S. PATENT DOCUMENTS

| | | | | |
|---|---|---|---|---|
| 5,072,958 A * | 12/1991 | Young | | 280/40 |
| 6,402,166 B1 * | 6/2002 | Chiu | | 280/47.38 |
| 6,974,150 B2 * | 12/2005 | Jane Santamaria | | 280/647 |
| 7,000,928 B2 * | 2/2006 | Liao | | 280/38 |
| 7,073,801 B2 * | 7/2006 | Sanders et al. | | 280/87.05 |
| 7,137,644 B2 * | 11/2006 | Kimberley | | 280/651 |
| 7,770,912 B2 * | 8/2010 | Liao | | 280/651 |
| 7,866,685 B2 * | 1/2011 | Liao | | 280/651 |
| D632,040 S * | 2/2011 | Liao | | D34/15 |
| 7,883,104 B2 * | 2/2011 | Driessen | | 280/650 |
| 8,128,104 B2 * | 3/2012 | Liao | | 280/38 |
| 8,191,920 B2 * | 6/2012 | Zhang | | 280/651 |
| 8,282,121 B2 * | 10/2012 | Lin | | 280/651 |
| 2006/0192366 A1 * | 8/2006 | Kimberley | | 280/651 |
| 2009/0066056 A1 * | 3/2009 | Liao | | 280/297 |
| 2009/0115168 A1 * | 5/2009 | Liao | | 280/651 |
| 2010/0176577 A1 * | 7/2010 | Liao | | 280/651 |
| 2010/0225093 A1 * | 9/2010 | Lin | | 280/642 |
| 2011/0316258 A1 * | 12/2011 | Lin | | 280/651 |
| 2012/0086189 A1 * | 4/2012 | Wu | | 280/651 |

* cited by examiner

*Primary Examiner* — Jeffrey J Restifo
*Assistant Examiner* — Erez Gurari (57) ABSTRACT

This application discloses a number of fold flat, collapsible, stowable wheel assemblies for wheeled carriers including but not limited to strollers, jogging strollers, flat carts, dollies, trolleys, wagons and carts. The application discloses novel methods to selectively fixate the wheel/tire position, to stow and fold flat, fixed, swivel and caster wheels so that the wheels/tires fold flat and generally parallel with the floor/base/frame of the device providing for a thin stowed profile. Also, one innovation provides for a flat cart and all wheels fold flat to the underside and side elevational profile of the carrier device. Other innovations relate to methods to manufacture and provide for fold flat caster or swivel wheels. One embodiment provides for a baby jogging stroller forward wheel/tire that is a selectively fixed, or becomes a swivel wheel, which quickly and easily may be folded flat along the jogger frame, without removing the wheel.

13 Claims, 7 Drawing Sheets

CARRIER DEVICES WITH FOLD FLAT, FIXED, CASTER AND/OR SWIVEL WHEEL ASSEMBLIES

RELATIONSHIP TO OTHER APPLICATIONS

This application applies to carrier devices and particularly to swivel, caster, and fixed wheel assemblies that fold flat into a thin, compact space-saving profile, and related prior applications by this inventor are U.S. Pat. Nos. 7,000,939, 6,863,297 and 6,581,945. A wide variety of carrier devices use caster wheels, swivel wheels, or fixed position wheels that have no significant fold flat attributes. The application discloses a number of alternative methods of providing for simple latches and releases in order to fold and move caster, swivel and fixed wheels into a thin profile on carrier devices. While applicant's prior referenced patents provided novel, fold flat "forward" wheels on carrier devices, this latest application provides novel latching methods to convert wheels from fixed or swivel wheels and for folding said wheels into a thin overall carrier device profile.

FIELD OF THE INVENTION

This application relates to novel fold flat wheel assemblies for wheeled carrier devices with a solid or fabric base and whether oriented angular to the rolling surface or generally parallel to the rolling surface, and discloses several alternative methods of providing for fix position wheels, or swivel wheels, all with movable, foldable wheel assemblies. The innovations are applicable to carrier devices, jogging strollers, strollers, carts, wagons, dollies, trolleys, golf bag carriers, etc.

BACKGROUND OF THE INVENTION

Applicant's prior United States patents, including but not limited to U.S. Pat. Nos. 7,000,939, 6,863,297 and 6,581,945 each include fold flat wheel assemblies. Currently, a wide variety of wheeled carrier devices typically called jogging strollers or baby joggers also include a forward wheel that swivels, or can be maintained in fixed position. Many carriers of this style have no fold flat, collapsible, storable attributes for the forward wheel. Likewise, there are many, varieties of carts and carriers that feature fixed and caster style wheels and typically these, products do not provide for any simple method that fold flat the caster, swivel wheels, or the fixed position wheels for that matter.

SUMMARY OF THE INVENTION

This application provides for compact, stowable fold flat wheeled carrier features particularly applying to swivel, caster or fixed wheel assemblies.

One of the purposes of the invention is to provide for a simple 360° swiveling caster wheel that has a second, stowed position where a user releases a latch, and the wheel is moved to and oriented parallel with the brace or floor of the carrier device, placing the entire wheel assembly in close proximity to the base/floor and within the side elevational profile of said carrier.

One of the purposes of the invention is to provide for a wheel assembly that allows 360° rotation about the vertical axle of a tire, allows for multiple fixed wheel positions of a tire by manual manipulation of a latching pin in order to selectively fixate the wheel position, and at least one of the multiple, fixed positions of the tire orients the tire orthogonal to the base or floor of the device, and then the swivel mount is moved 90° orienting the entire tire/wheel and its securing fork parallel with the floor or base and within the side elevational profile of the carrier device.

Another purpose of the invention is to provide for a wheel assembly with a swivel mount, with a separate brace plate, with the means for the swivel mount to move 90° in relation to the brace plate, and to provide for resilient or positive retention of the swivel mount, in a stowed position, whereby the tire/wheel is oriented parallel with the base/floor in the side elevational profile.

It is another object of the invention to provide that when the swivel mount is moved to the stowed position that resilient retention between a portion of the swivel mount, and a portion of the novel caster wheel assembly is created, comprising a base plate, a swivel mount wheel assembly, a pivot which allows for movement of the swivel mount assembly of the wheel in relation to that brace plate, and movement of the swivel mount wheel assembly 90° in relation to the brace plate also serves as the retention for a swivel mount wheel assembly in a stowed position where the wheel is generally parallel with the floor/base of the carrier device.

It is another object of the invention to provide for a caster wheel assembly that is stowable, which orients the wheel/tire parallel with the floor/base of the carrier device, and an innovation whereby simple manual manipulation of the caster wheel moves the caster wheel from a fixed position, allowing the wheel/tire to be turned approximately 90° and allowing for a separate manually manipulable latch which then allows for movement and stowing of the swivel mount wheel assembly into a stowed position where the tire is generally parallel with the base/floor of the carrier device.

Another object of the invention is to provide for a generally flat 3 or 4 wheeled carrier where at least three wheels fold flat in the general manner outlined in this application orienting each of the wheels/tires parallel and flat with the underside of the carrier device, and providing for a handle which also folds flat to the carrier device base so that the overall device parts are all within the side elevational profile of said carrier device.

It is another object of the invention to provide for a caster wheel/tire with a swivel mount to which the tire is mounted, and a separate brace plate, and a pivot to interconnect the two parts, so that the brace plate may be attached, riveted or screwed to the base of any typical carrier device so that the foldable caster tires, may be universally mounted to virtually any flat cart or trolley underside.

BRIEF DESCRIPTION OF THE DRAWINGS

FIG. 6-A is a side elevational view of an alternate carrier device B, 27, which includes a U-shaped handle which is foldable as are the wheels, 2, into the side elevational profile of the carrier;

FIG. 6-B is an underside plan view of the alternate carrier device B, showing all wheels, 2 as well as the U shaped handle, in stowed positions;

FIG. 6-C. is a cut away view of the foldable wheel mount assembly, and the associated wheel in the operative position with the foldable wheel mount and brace plate not connected to the carrier device cart or trolley underside for purposes of this view;

FIG. 6-D. is a similar view to 6-C., except the same wheel or tire, 2 is folded approximately 90° into the stowed position.

DESCRIPTION OF THE PREFERRED EMBODIMENTS

Referring to the drawing figures, the following are the descriptions of the numbered elements: 1 carrier device; 2 wheel; 3 wheel fork; 4 wheel axis of rotation; 5 frame/periphery; 6 pivot; 7 pivot retaining nut; 8 latching pin assembly; 8-A latch pin assembly pin; 9 360° swivel assembly; 10 spring; 11 latch pin finger tab; 12 retaining means in stowed position; 13 brace plate right angle rib retainer; 14 brace plate periphery rib; 15 brace plate periphery rivet/connector; 16 brace plate; 17 brace swivel mount opening; 18 retaining means in the setup position; 19 brace plate pivot retaining arm; 20 foldable wheel mount; 21 foldable wheel mount pin fixation hole; 22 foldable wheel mount latching means; 23 détente arms; 23-A movable détente; 24 wheel mount pivot opening; 25 tire fork mounting bolt; 26 tire fork mounting bolt nut.

Figure 1:
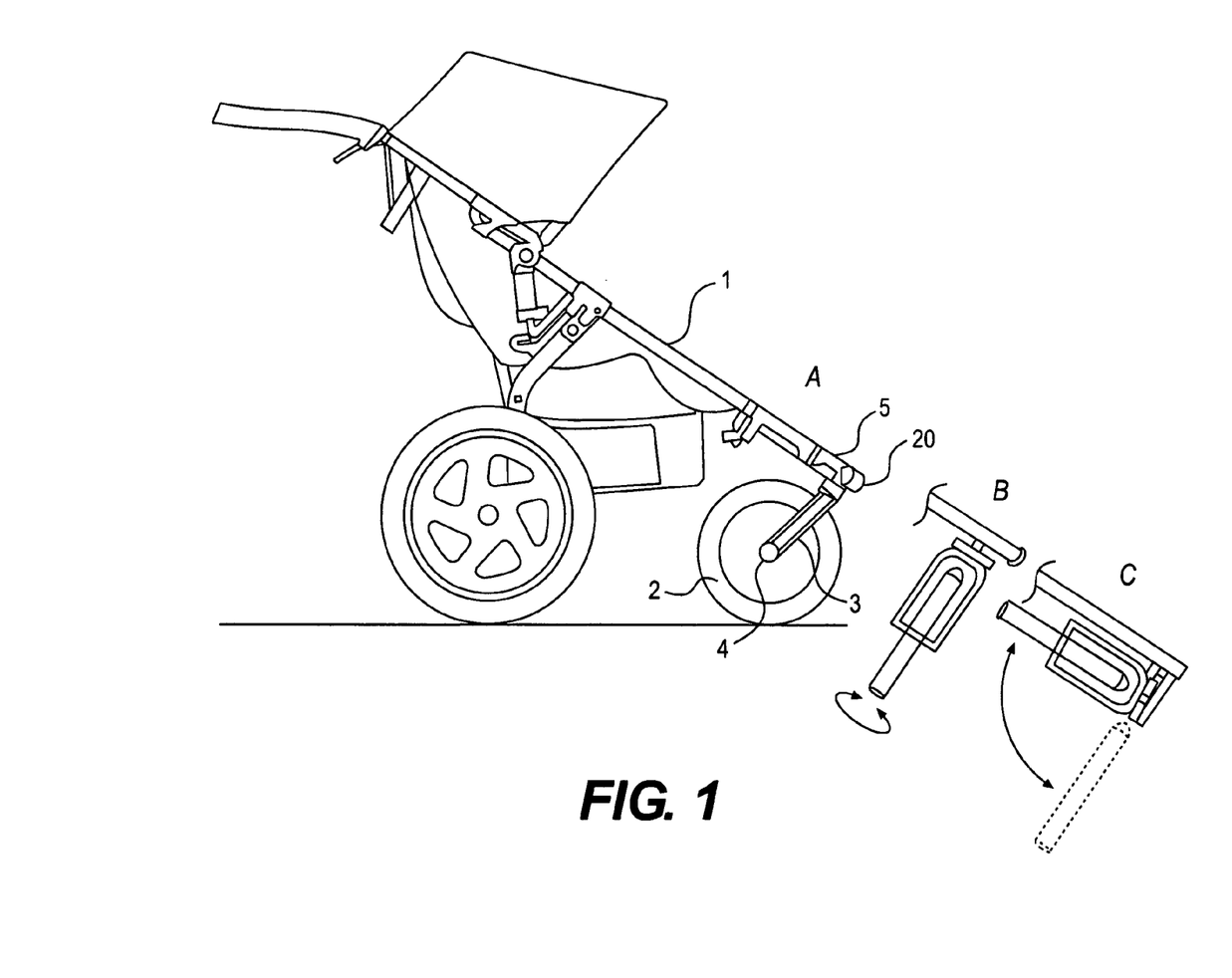
FIG. 1 is a side elevational profile of one embodiment of a wheeled carrier device 1, generally referred to as a stroller/jogger with a swivel front wheel; A shows the operative position; B. shows an intermediate position where the swivel wheel is rotated 90°; and C shows a stowed position of the forward wheel/tire.

Referring to the drawings, FIG. 1 shows a carrier device, 1 with the forward wheel, 2, in the operative position allowing for rolling movement of the carrier device, 1. The operative position is shown in A, an intermediate position is shown in B, and a fully stowed forward wheel position is shown in C view.

Referring back to the operative position A, the forward wheel, 2 is shown which rolls along its axis of rotation, 4. The wheel fork, which interconnects to the carrier device frame is shown at 3. The wheel fork, 3, interconnects with the frame/periphery of the carrier device, 5, by virtue of the foldable wheel mount, 20. In FIG. 1, the forward wheel, 2, may operate as a fixed position wheel, or as a swivel position forward wheel. One of numerous latching methods can be utilized for the view that is labeled B which shows the forward wheel is rotated 90° along its wheel mount, 20. Once the wheel is rotated 90° mentioned, the wheel can be fixated and latched in this position and one of numerous methods shown in other drawing figures. In FIG. 1, fully folded view C shows that the tire is swept through an angle to a fold flat position. The act of folding the wheel into the stowed position can occur through firm manual pressure, or through the release of any suitable latch.

Figure 2:
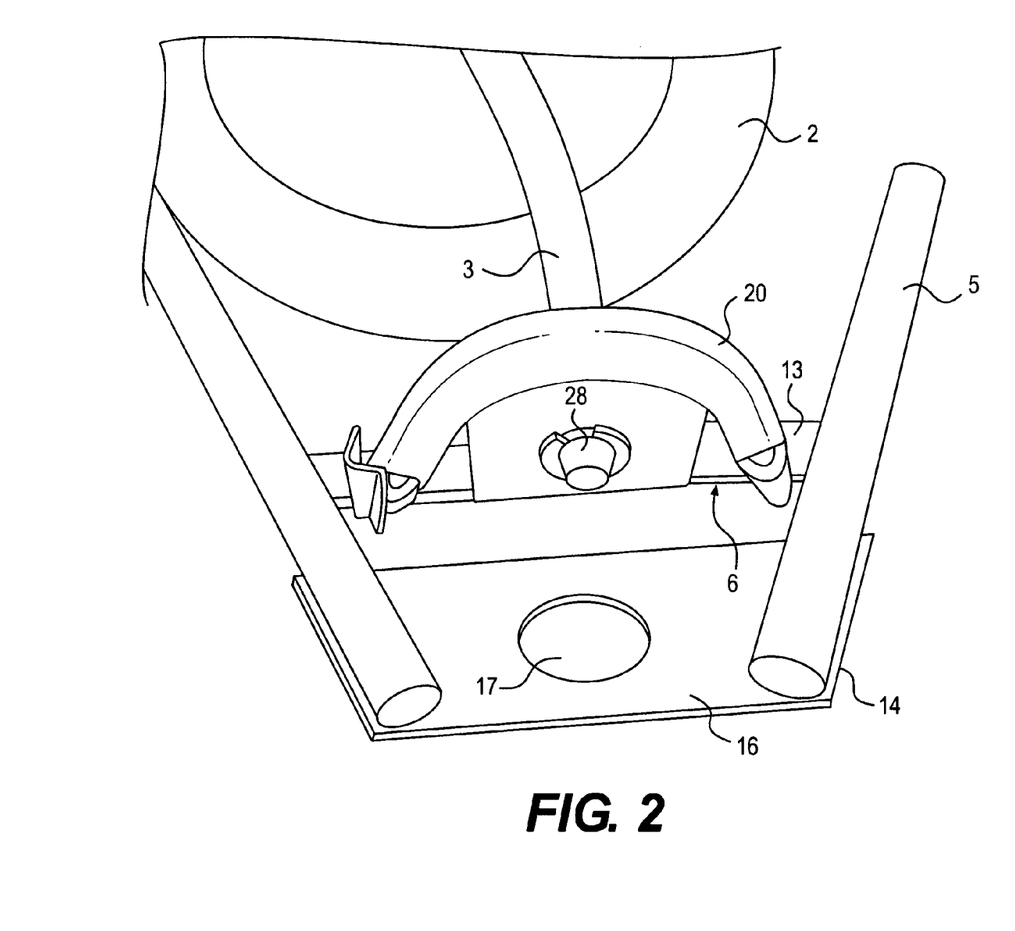
FIG. 2 is an underside view, with the frame partially cut away of carrier device 1, showing the swivel wheel mount in the stowed position.

Now referring to FIG. 2, an underside view of the carrier device 1 is shown, with the frame partially cut away from the remainder of the carrier device focusing on the wheel in the fully stowed position. The figure shows a part of the carrier device frame referred to as the brace plate, 16 which includes a suitable brace plate swivel mount opening, 17 and brace plate periphery ribs, 14. A foldable wheel mount, 20, is mounted by virtue of a pivot, 6. FIG. 2 shows the wheel 2 in the fully stowed position. Any suitable shaped brace plate right angle rib, 13, may be employed to provide structural support and also to serve as a stop for the fully stowed wheel when it abuts against the brace plate right angle rib. The brace plate swivel mount opening may be suitably shaped so that a bolt or nut that connects the tire to the foldable wheel mount may protrude through the opening and still allow for swivel of the tire/wheel, 2.

Figure 3:
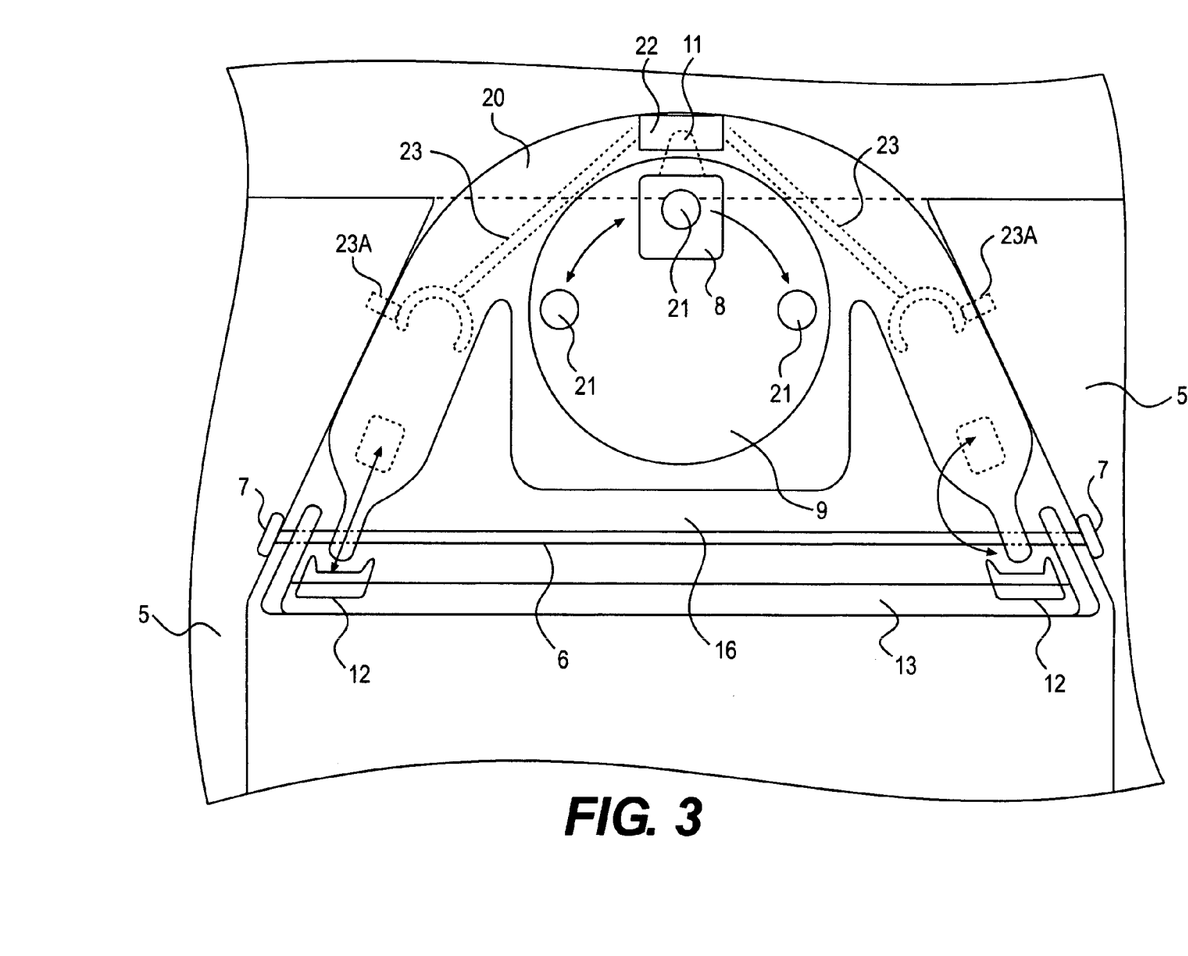
FIG. 3 is an underside view focused on the latched view of the foldable swivel wheel assembly system, partially cut away to reveal multiple fixation positions of the swivel mount, as well as alternative latching means.

Referring to FIG. 3 is a different underside view and the wheel, 2 is not shown, but the other underside parts are as follows: along the frame/periphery, 5 is mounted a transverse brace plate, 16. Any suitable pivot is transversely mounted along the frame and is retained on either end by a pivot retainer nut, 7. Further movably mounted to the pivot is the foldable wheel mount, 20. A 360° swivel assembly, 9, is mounted to the foldable wheel mount, 20. A series of openings or holes are created through the 360° swivel assembly, 9. These openings, 21, receive a latching pin assembly, 8 which includes a latching pin, 8 A and the latching pin is manipulable to travel through the opening or holes, 21. Again, not shown in FIG. 3 is the actual tire fork, 3, or the tire, 2 which would normally be mounted on the 360° swivel assembly, 9 which forms an integral part of the foldable wheel mount, 20. However, for purposes of explaining the operation of the innovation, the figure shows multiple openings, 21, and it is understood that the latching pin assembly, 8, and it's latching pin, 8A, may be manually manipulated which allows the tire fork to be moved 90°, for example, and the manually manipulable latching pin, 8A, may be pressed so that the pin engages into an opening, 21 which fixes the position of the tire in preparation for the tire/wheel to be folded into the fully stowed position shown in other figures.

FIG. 3 also shows several other options. First, the foldable wheel mount, 20, may be resiliently held in place against the brace plate without any special latch. However, FIG. 3 shows an optional series of detente arms, 23, and a movable detente, 23A, which are caused to be moved by any suitable latch pin finger tab, 11. In operation, the user would press the latching pin finger tab 11, which would cause movement of the detente, 23A, allowing for manual movement of the foldable wheel mount, 20, to the stowed position not shown in the figure. Another option is that when the foldable wheel mount, 20 is moved preferably 90° to the stowed position, it may be resiliently latched to another surface of the components, namely a retaining means element, 12. Thus, when the foldable wheel mount, 20, is moved to the fully stowed position, a suitable portion of the wheel mount, 20, engages in resilient connection with a portion, 12, further mounted to a portion of the brace plate, 16, or along a brace plate right angle rib, 13.

Figure 4:
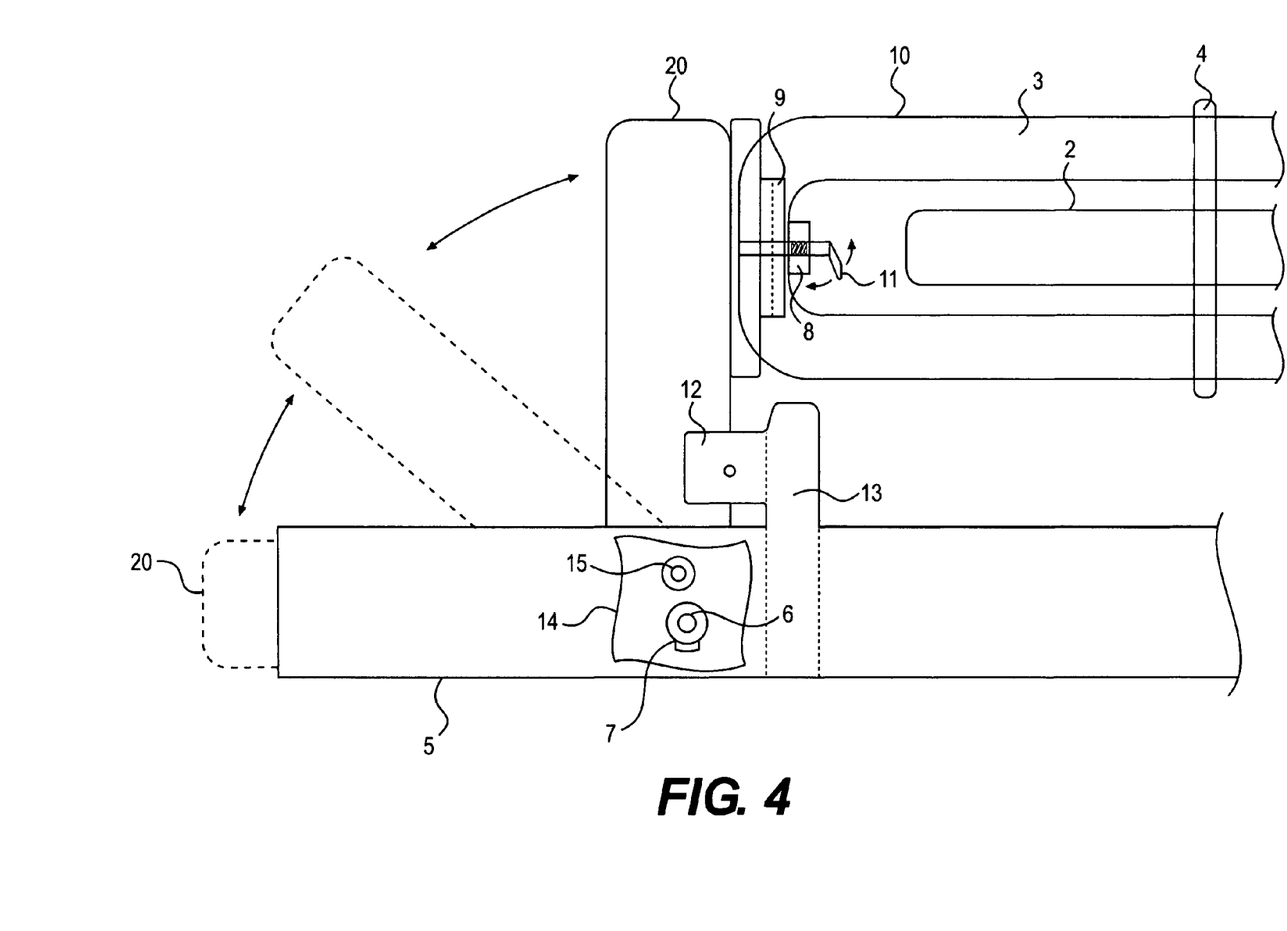
FIG. 4 is a side elevational view of carrier device 1 with the wheel/tire in the stowed position, partially cut away to show the swivel mounts parts.

FIG. 4 is a side elevational view of the fully stowed tire fork, 3, and tire, 2. In this side elevational view, the frame or periphery, 5 is shown along with one representative brace plate periphery rib, 14, and a rivet/connector, 15 interconnecting part of the brace plate to the frame, 5. Also one terminal end of the pivot, 6, is shown being held in place outside the frame with a pivot retainer nut, 7. This pivot, 6, serves to retain the foldable wheel mount, 20 which is folded into and against a 90° fold resilient stop, called the retaining means for the stowed position, 12. This stop, 12, may be formed from a portion of the brace plate right angle rib, 13.

FIG. 4 further shows the tire fork, 3 which has been latched in a position along the foldable wheel mount, 20, by virtue of a finger tab, 11 which has been seated in a hole in the 360° swivel mount, 21 (not shown here but shown in other figures). Also, the finger tab, 11, includes details showing a suitable spring, 10, which allows for the spring biasing of the latching pin which is mounted as part of the latching pin assembly, 8. The manually manipulable finger tab, 11, provides for movement of the latching pin, 8A in and out of engagement with the swivel assembly, 9. A ghost view of the wheel, 2, indicates movement of the foldable wheel mount, 20 to the operative or stowed position shown.

Figure 5:
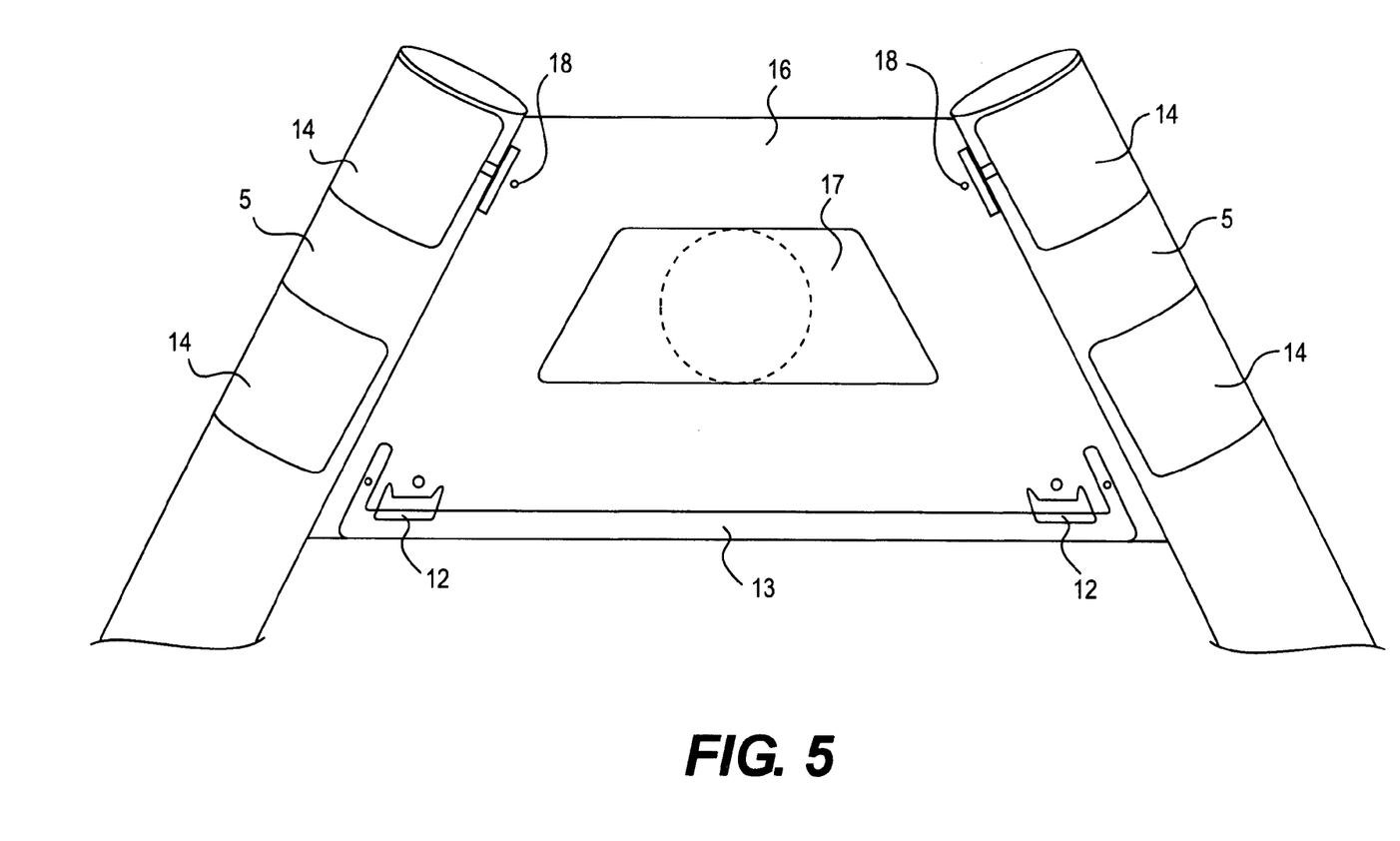
FIG. 5 is an underside plan view of carrier device 1, showing the brace plate connection to the original frame.

FIG. 5 again shows the underside view of the frame or periphery, 5, brace plate periphery ribs, 14 and the brace plate, 16. This view shows an alternative or optional method to secure the foldable wheel mount, 20 when in the operative position against the brace plate, 16. The said operative position of the foldable wheel mount may simply be resilient engagement between the wheel mount, 20, and nibs, 18 thus creating resilient engagement between the frame and the foldable wheel mount, 20. Also, when the foldable wheel mount, 20 is moved to the folded position, this view indicates a resilient capture position for the foldable wheel mount, 20 against retaining means for this stowed position, 12. Any suitable resilient retention means can be the latch means, which can be overcome by manual manipulation or by any other suitable male-female latching means as just examples (not shown).

Figure 6A:
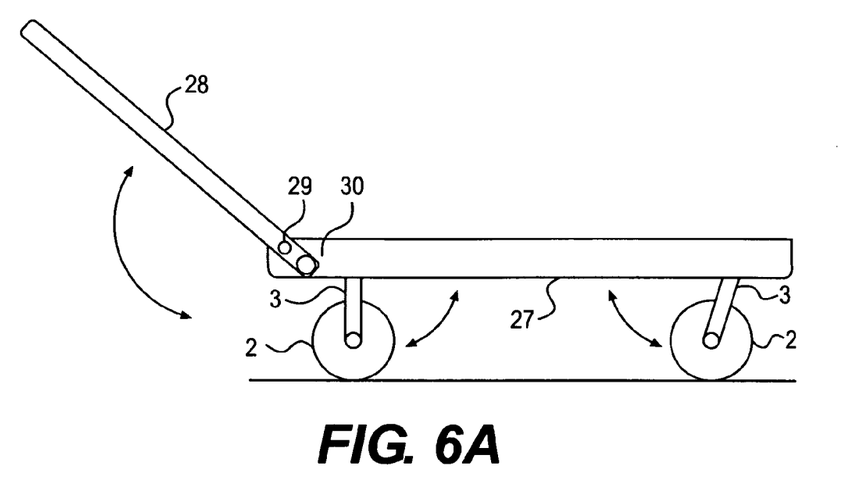
Figure 6B:
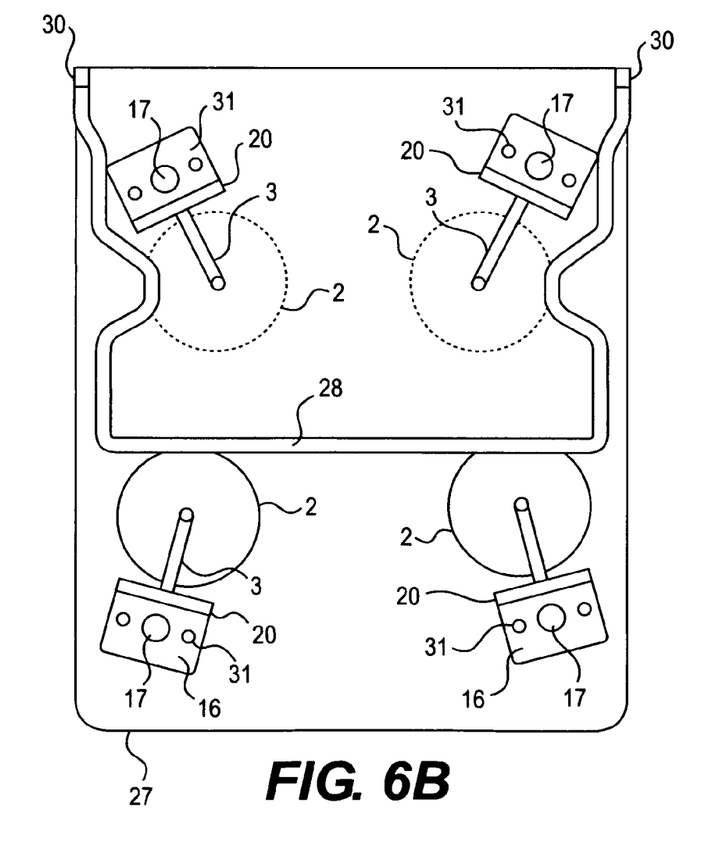
Figure 6C:
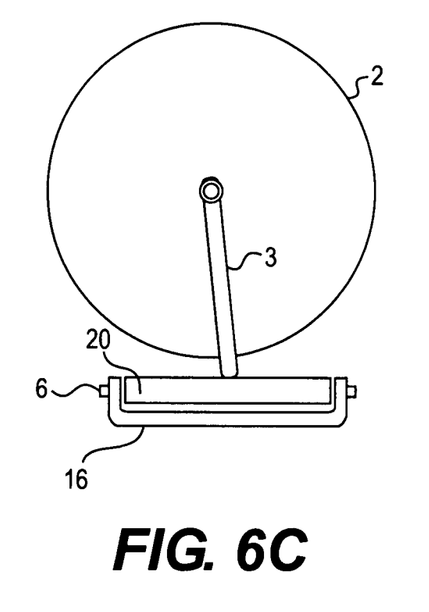
Figure 6D:
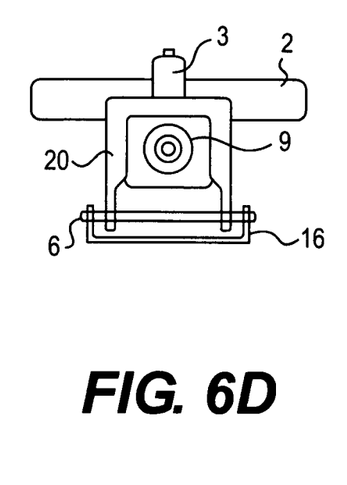

FIG. 6A shows an alternate carrier device B, denoted 27. This carrier device B is commonly referred to as a flat cart or trolley. Carrier device B., includes a generally "U" shaped handle, 28 which has an operative position where the handle is latched in position by any suitable latch, 29, and the latch, 29 is manipulated to allow the handle to pivot to a stowed position as shown in FIG. 6B, preferably folded within the side elevational profile of the carrier device underside (after the wheels, 2 are collapsed) although it is appreciated that instead the handle may be folded flat to the top side of the carrier. FIG. 6A also shows the wheels, 2, in their operative position. In contrast, FIG. 6-B. shows an underside view of the carrier device with all four wheels, 2, in their stowed position where the wheels are all generally parallel and within the side elevational profile of the carrier. The shape of the U-shaped handle facilitates retention of the wheels, 2, in their stowed position. FIG. 6-C and FIG. 6-D show detail of the method where the tire or wheel, 2 folds into a stowed position similarly to FIGS. 2-4, on the carrier device, 1. FIG. 6-C shows the wheel, 2 in its operative position, and in this position the foldable wheel mount, 20 is generally parallel with a retaining portion of the wheel mount, the brace plate, 16. Suitable resilient or other retaining means hold the wheel mount, 20, in the operative position against said brace plate, 16. The foldable wheel mount, 20, is movable and pivotable along the pivot, 6. As reflected in FIG. 6-D., the same tire or wheel, 2, is instead shown in the folded position where the tire or wheel, 2, folds approximately 90° along the foldable wheel mount, 20, by movement of the mount along the pivot, 6. Means to retain the foldable wheel mount, 20, are shown elsewhere in the application. FIG. 6 A-D do not show detail of the latching pin assembly, 8 and its sub-components, which are referred to elsewhere. These components serve to retain the tire or wheel in one of several fixed positions before the tires are completely stowed parallel with the carrier frame 5 by movement of the wheel mount, as also shown in FIG. 6-B.

It is appreciated that any elements of one figure and embodiment in this application may be mixed with any other novel elements of any other design figure.

What is claimed is:

1. A wheeled carrier device, including a support frame defining a side elevational profile and an outer perimeter, at least one wheel support assembly defining a support arm connecting a wheel and its axis of rotation to a swivel wheel mount which is connected to a movable brace, the device further including manually manipulable latching means between the swivel wheel mount and the movable brace, in a first, operative position the at least one wheel is erected and oriented to provide rolling support for the device movement, in a second, intermediate wheel position the wheel axis of rotation is near to 90° from the first, operative wheel position latched against movement and in a third, stowed position the movable brace is orthogonal to the device support frame and the wheel is parallel with, and within the side elevational profile of, the support frame.

2. A device in accordance with claim 1 wherein the wheel support assembly is latched in the third, stowed position by at least one resilient connection between a portion of the support frame and a portion of the wheel support assembly.

3. A device in accordance with claim 1 wherein the latch between the swivel wheel mount and the movable brace includes a manually movable latch which selectively moves a latching pin into and out of engagement between the swivel wheel mount and the movable brace.

4. A device in accordance with claim 1 wherein the wheeled device is a three wheeled jogging stroller with a handle formed from part of the said support frame, which includes at least 2 rear most wheels in addition to the wheel support assembly which forms a forward most wheel.

5. A device in accordance with claim 1 wherein the movable brace is connected to the support frame with a pivot.

6. A device in accordance with claim 1 wherein the movable brace is connected to the support frame by oppositely extending mounting portions.

7. A device in accordance with claim 1 wherein the movable brace is selectively releasable from at least one connection to the support frame by manual manipulation of a détente forming the latching means.

8. A device in accordance with claim 1 wherein the movable brace is latched to the support frame by a resilient connection means, and is manually movable from said first, operative position by manual pressure which releases said resilient connection.

9. A device in accordance with claim 1 wherein the movable brace and the swivel mount include at least two user selectable latch fixation positions.

10. A wheeled carrier device in accordance with claim 1 wherein in the said third, stowed position of the wheels, all said wheels are affixed to said support frame along a substantially common horizontal plane.

11. A device in accordance with claim 1 wherein a retention element in the first, operative position forms at least one children's stroller seat that accommodates at least one child, and at least part of the support frame serves as the stroller handle.

12. A device in accordance with claim 1 wherein a retention element in the first, operative position retains cargo.

13. A device in accordance with claim 1 wherein a retention element in the first, operative position retains at least one person.

* * * * *